No. 765,950. PATENTED JULY 26, 1904.
C. WÜST-KUNZ.
DOUBLE HELICAL SPUR WHEEL.
APPLICATION FILED FEB. 1, 1902.

NO MODEL.

Witnesses:

Inventor:
Caspar Wüst-Kunz.
by
Attys

No. 765,950. Patented July 26, 1904.

UNITED STATES PATENT OFFICE.

CASPAR WÜST-KUNZ, OF SEEBACH, SWITZERLAND.

DOUBLE HELICAL SPUR-WHEEL.

SPECIFICATION forming part of Letters Patent No. 765,950, dated July 26, 1904.

Application filed February 1, 1902. Serial No. 92,182. (No model.)

*To all whom it may concern:*

Be it known that I, CASPAR WÜST-KUNZ, a citizen of the Republic of Switzerland, residing at Seebach, Switzerland, have invented new and useful Improvements in Double Helical Spur-Wheels, of which the following is a specification.

This invention has relation to double helical spur-gearing, and, as is well known, this type of gearing is usually obtained by casting, owing to the difficulty and labor involved in cutting the teeth with ordinary discoidal gear-cutters. I have discovered a method whereby this difficulty is avoided and so that the cutting of the teeth can be effected with the same facility and with as little labor as the cutting of the teeth of an ordinary spur-gear. This method lies simply in extending or prolonging the spaces between the teeth on either side of the center line of the wheel-rim beyond said center line, whereby I am enabled to use a rotary cutter.

In order that my invention may be fully understood, I will describe the same in detail, reference being had to the accompanying drawings, in which—

Figure 2:
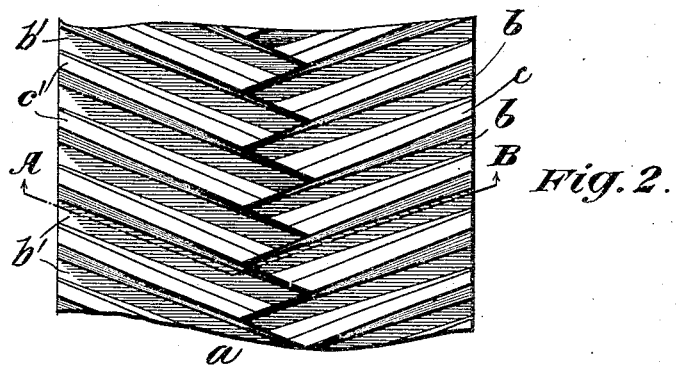
Figure 3:
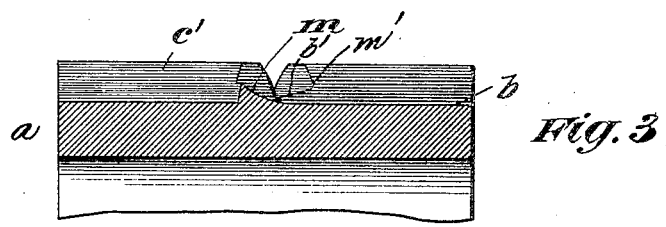
Figure 1:
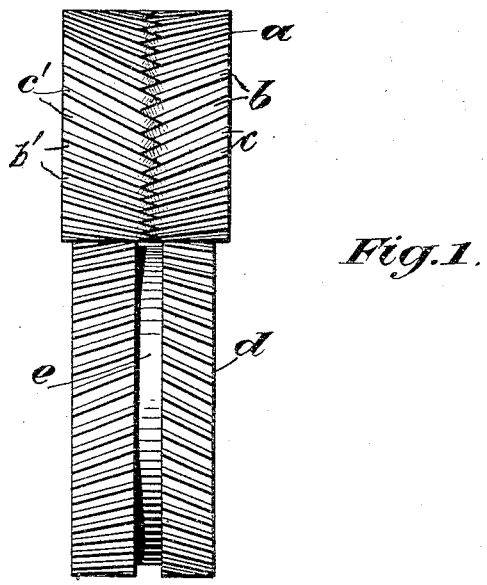

Figure 1 is a plan view of a pair of double helical gear-wheels embodying my invention and of that type wherein the teeth on one side of the center of the wheel-rim are staggered or transposed relatively to the teeth on the opposite side of said center, so that if prolonged they would intersect each other. Fig. 2 is a fragmentary plan, drawn to an enlarged scale, of one of said wheels; and Fig. 3 is a cross-section of the wheel-rim on the line A B of Fig. 2.

In carrying out the described method of cutting the teeth of a double helical gear-wheel of the type referred to by means of a discoidal rotary cutter it is obvious that the teeth $c\ c'$ on either side of the center of the wheel will be cut away along said center line or at or substantially at the points where the teeth $c$ on one side would, if prolonged, intersect the teeth $c'$ on the opposite side of said center if the spaces $b$ and $b'$ between the teeth $c$ and $c'$, respectively, are to be prolonged beyond said center line to admit of the use of a rotary cutter. On the other hand, it is obvious that when the teeth $c$ and $c'$ register along the center line of the wheel-rim—that is to say, when the teeth are V-shaped—and the spaces $b$ and $b'$ are prolonged or extended beyond the center line to admit of the use of a rotary cutter the latter will then cut into said teeth at points on opposite sides of the center line without necessarily cutting through the same. In either case the bottom $b$ or $b'$ of the space between the teeth $c$ and $c'$, respectively, will curve upwardly at the inner or converging end of said spaces—*i. e.*, at the points where the cutter ceases to cut—owing to the discoidal form of the latter, as more clearly shown at $m$ and $m'$, Fig. 3. Of course in either case the teeth $c$ and $c'$ are mutilated along the center of the wheel-rim, and two such gear-wheels would therefore not mesh properly; but this I avoid by cutting a peripheral groove $e$ in one of a pair of intermeshing gear-wheels—as, for instance, in the gear-wheel $d$, Fig. 1—such groove being of a width equal to or substantially equal to the space between the highest point $m$ of the rise of the bottom of the space $b$ between teeth $c$ and the like point $m'$ of the bottom of the space $b'$ between teeth $c'$. In this manner I secure a perfect mesh and a substantially noiseless rotation of the gearing.

It will readily be understood that a gear of the construction described and having the central groove $e$ cut into the same will gear with a similar wheel of usual construction—that is to say, a gear-wheel of the staggered type provided with the groove $e$ will gear with a like wheel of the same type and of usual construction and a gear-wheel having V-shaped teeth cut according to the method referred to and provided with said groove will gear with a like wheel of usual construction.

Having thus described my invention, what I claim as new therein, and desire to secure by Letters Patent, is—

1. A gear-wheel having helical teeth arranged in two sets on the same piece, each tooth on one side of the face of the wheel ending at the space between two teeth on the other side of the face of the wheel, substantially as and for the purpose set forth.

2. A gear-wheel having helical teeth arranged in two sets on the same piece, each tooth on one side of the face of the wheel being directed toward the space between two teeth on the other side of the face of the wheel, there being a peripheral groove around the wheel between the two sets of teeth, substantially as and for the purposes set forth.

3. A gear-wheel having helical teeth arranged in two sets on the same piece, one on each side of the wheel, each tooth on one side being directed toward the space between two teeth on the opposite side, the bottom of the space between two succeeding teeth on a side passing across the end of a tooth on the opposite side and ending in an upward curve to the face of that tooth, substantially as and for the purposes set forth.

4. A gear-wheel having two sets of helical teeth on the same piece, the teeth of one set made on a helix oppositely directed to the helix on which the other set is made, there being a peripheral groove around the wheel between the two sets of teeth, substantially as and for the purposes set forth.

In testimony whereof I have signed my name to this specification in the presence of two subscribing witnesses.

CASPAR WÜST-KUNZ.

Witnesses:
MORITZ VEITH,
A. LIEBERKNECHT.